United States Patent
Hrncir et al.

(10) Patent No.: US 10,409,010 B2
(45) Date of Patent: Sep. 10, 2019

(54) CONNECTORS FOR FIBER OPTIC CABLES

(71) Applicant: Eaton Corporation, Cleveland, OH (US)

(72) Inventors: Daniel Edward Hrncir, Arden, NC (US); Robert Judson Burns, Hendersonville, NC (US); David Aaron Metcalf, Black Mountain, NC (US)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 15/846,595

(22) Filed: Dec. 19, 2017

(65) Prior Publication Data

US 2018/0196206 A1    Jul. 12, 2018

Related U.S. Application Data

(63) Continuation-in-part of application No. 15/403,562, filed on Jan. 11, 2017, now abandoned.

(51) Int. Cl.
*G02B 6/38* (2006.01)
*G02B 6/42* (2006.01)

(52) U.S. Cl.
CPC .......... *G02B 6/3897* (2013.01); *G02B 6/38* (2013.01); *G02B 6/381* (2013.01); *G02B 6/3881* (2013.01); *G02B 6/423* (2013.01)

(58) Field of Classification Search
CPC ........ G02B 6/38; G02B 6/381; G02B 6/3817; G02B 6/3825; G02B 6/3826; G02B 6/3831; G02B 6/3881; G02B 6/3885; G02B 6/3897; G02B 6/403; G02B 6/423; G02B 6/4452; G02B 6/4454; G02B 6/4455; G02B 6/4457; G02B 6/4478
USPC .................................... 385/53–87
See application file for complete search history.

(56) References Cited

U.S. PATENT DOCUMENTS 7,813,613 B2 * 10/2010 Fenwick ............ G02B 6/3885
    385/140
2018/0306979 A1 * 10/2018 Armistead .......... G02B 6/3816

* cited by examiner

*Primary Examiner* — Michael P Mooney
(74) *Attorney, Agent, or Firm* — Benesch Friedlander Coplan & Aronoff LLP

(57) ABSTRACT

An apparatus includes first and second components. A track supports one of the components for movement toward the other of the components. A first connector is mounted on the first component. The first connector retains an end portion of a first fiber optic cable, and has a first alignment portion. A second connector retains an end portion of a second fiber optic cable, and has a second alignment portion. The second alignment portion guides the second fiber optic cable radially into coaxial alignment with the first fiber optic cable upon movement of the first alignment portion against the second alignment portion. A floating mount device supports the second connector on the second component for guided movement radially relative to the second component upon movement of the first alignment portion against the second alignment portion.

20 Claims, 8 Drawing Sheets

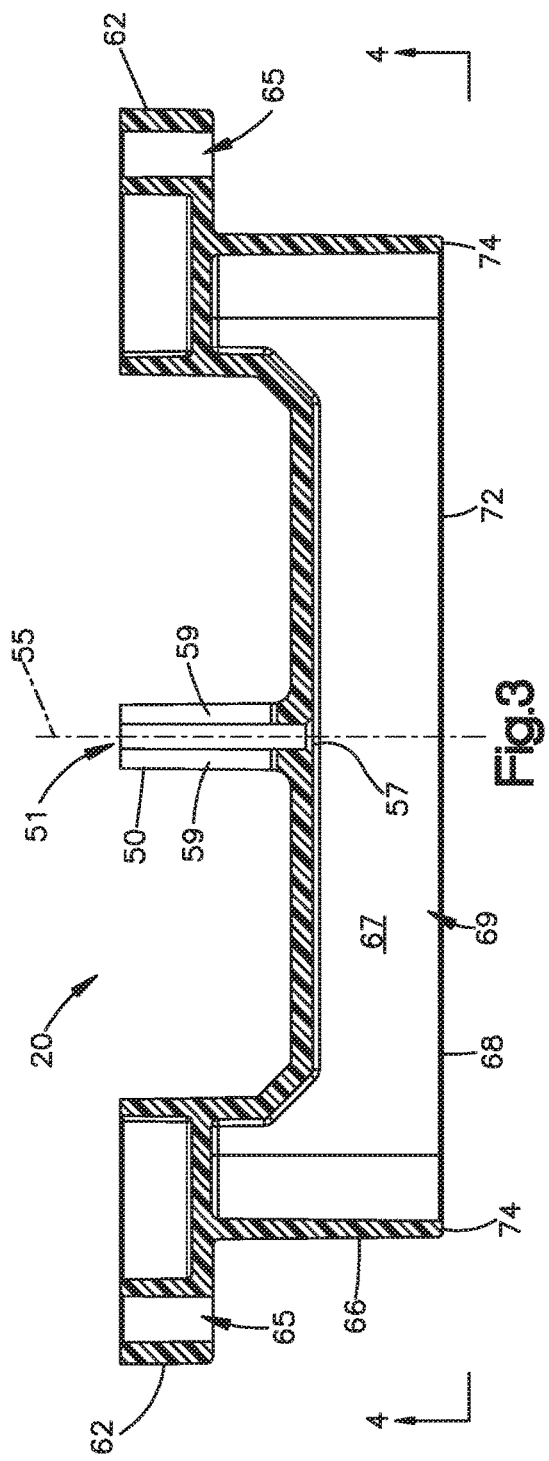
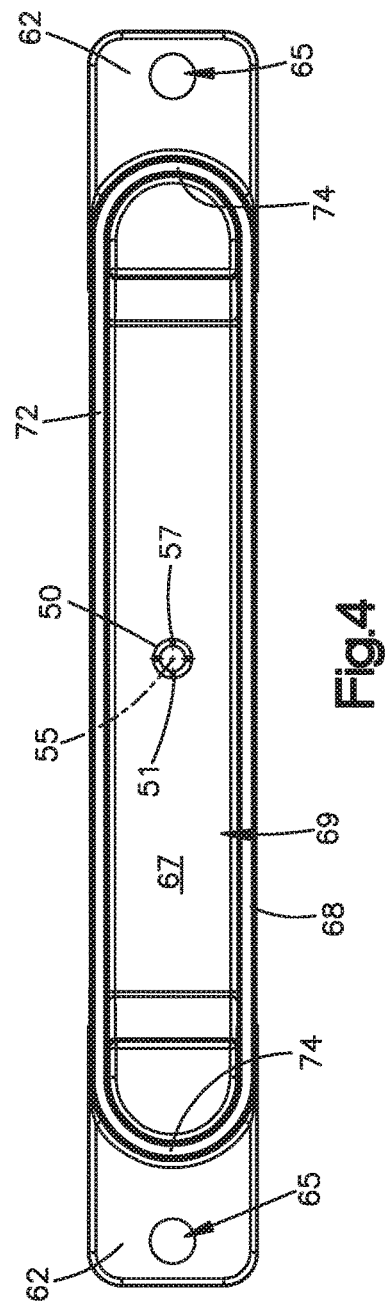

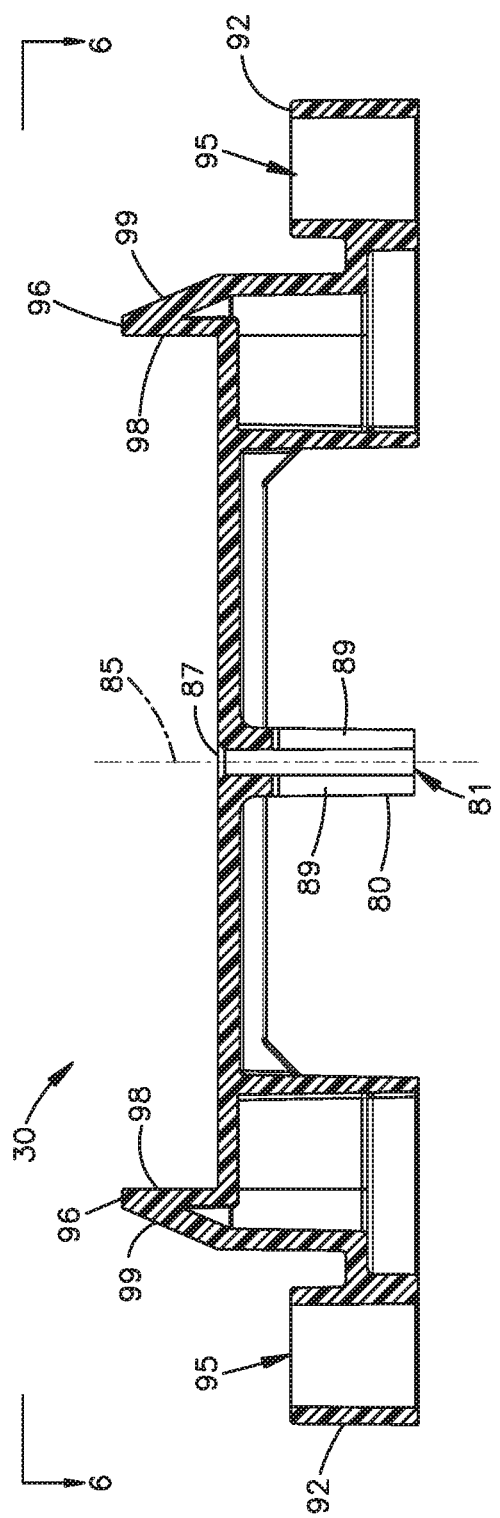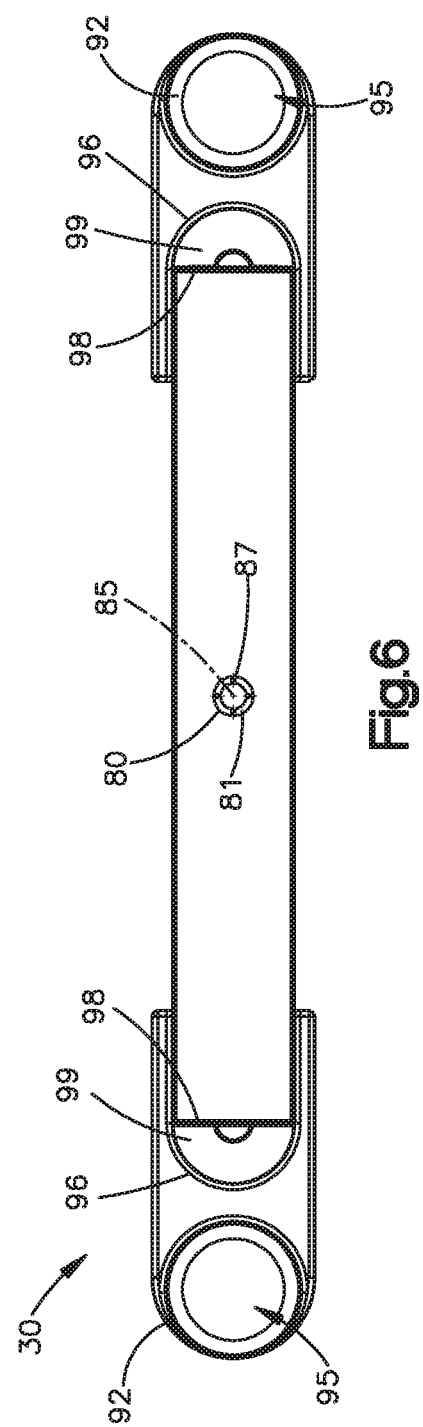

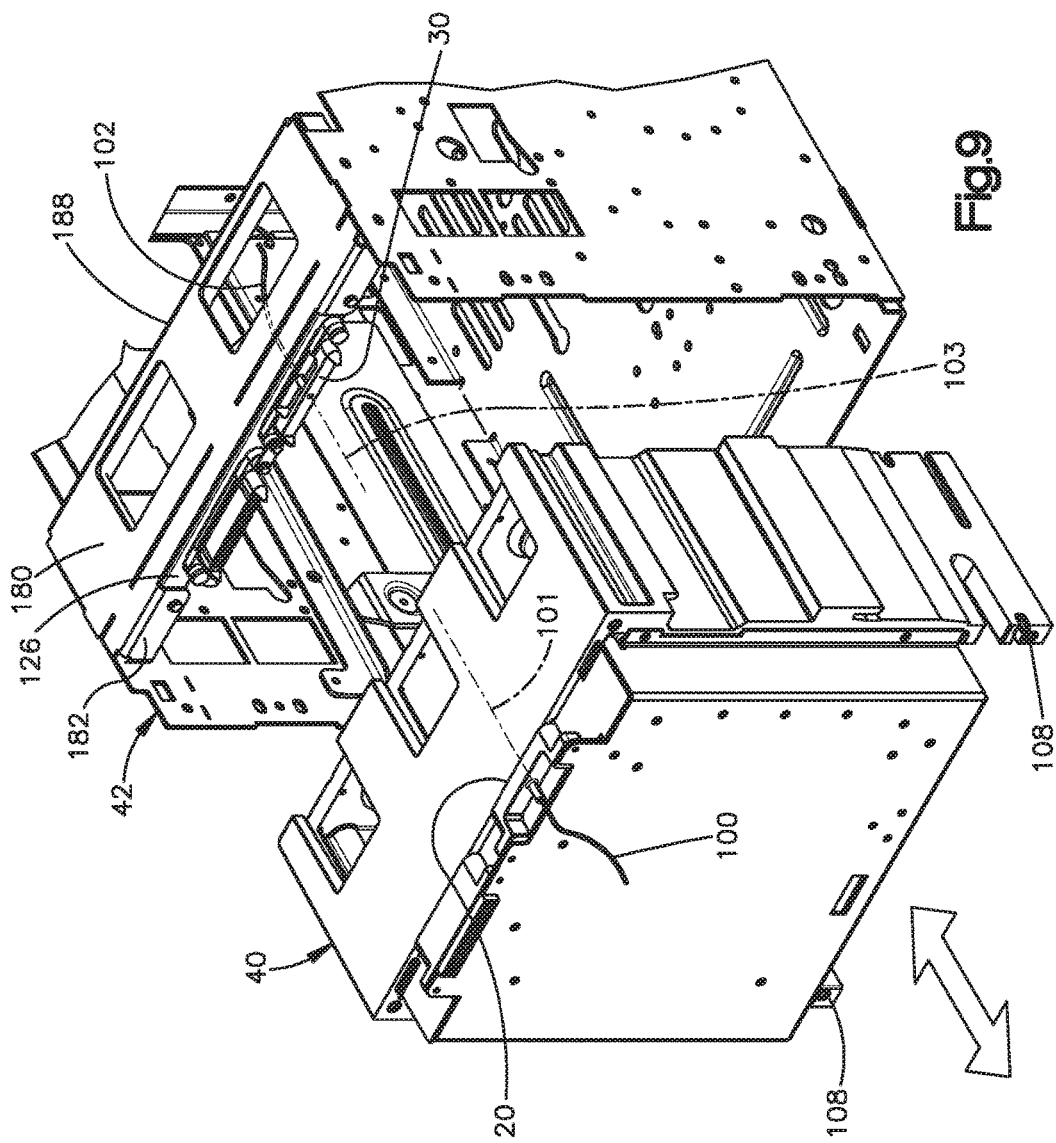

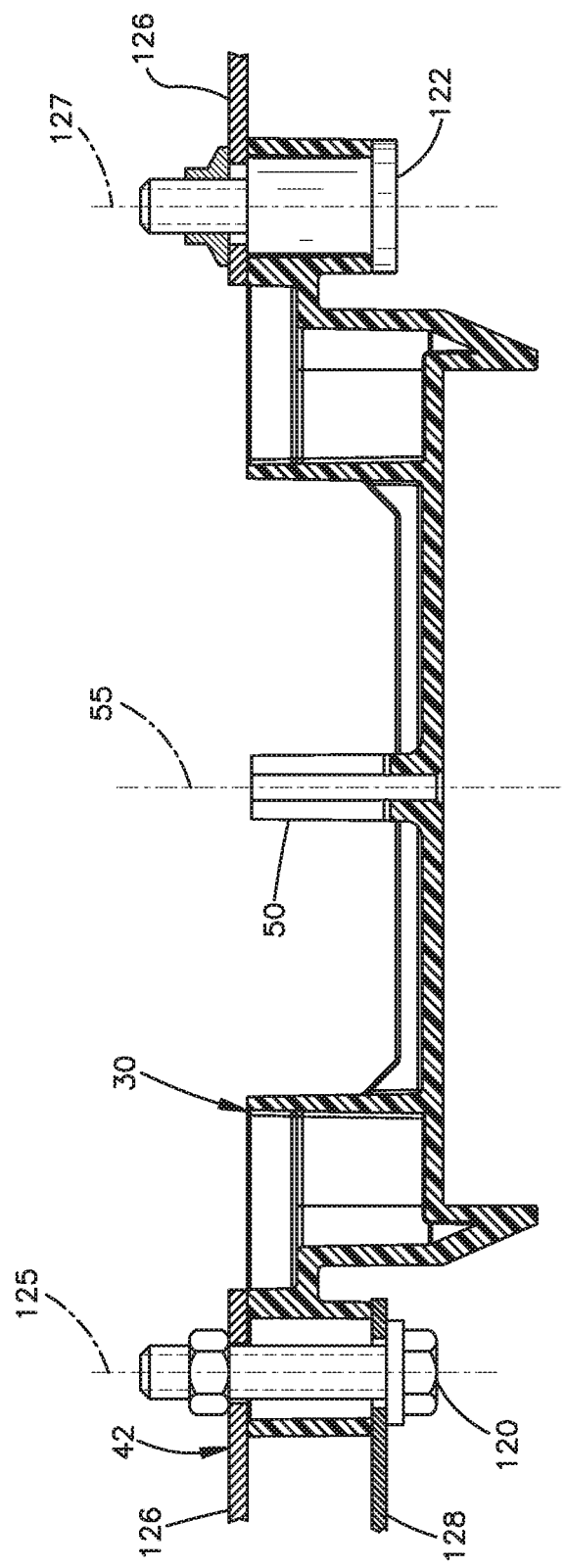

CONNECTORS FOR FIBER OPTIC CABLES

RELATED APPLICATIONS

This application is a continuation-in-part of U.S. patent application Ser. No. 15/403,562, filed Jan. 11, 2017, which is incorporated by reference in its entirety.

TECHNICAL FIELD

This technology relates to interconnection of fiber optic cables.

BACKGROUND

When fiber optic cables are interconnected end-to-end, it is desirable to support the ends of the cables in coaxial alignment.

SUMMARY

An apparatus includes first and second components. A track supports one of the components for movement toward the other of the components. A first connector is mounted on the first component. The first connector retains an end portion of a first fiber optic cable, and has a first alignment portion. A second connector retains an end portion of a second fiber optic cable, and has a second alignment portion. The second alignment portion guides the second fiber optic cable radially into coaxial alignment with the first fiber optic cable upon movement of the first alignment portion against the second alignment portion. A floating mount device supports the second connector on the second component for guided movement radially relative to the second component upon movement of the first alignment portion against the second alignment portion.

Other parts of the apparatus may include a frame, a spring, and a bracket supported on the frame for movement against a bias of the spring. The frame, the spring, and the bracket may be parts of the second component. The second connector may be mounted on the bracket for movement with the bracket relative to the frame.

BRIEF DESCRIPTION OF THE DRAWINGS

FIG. 3 is a sectional view of a connector shown in FIGS. 1 and 2.

FIG. 4 is a view taken on line 4-4 of FIG. 3.

FIG. 5 is a sectional view of another connector shown in FIGS. 1 and 2.

FIG. 6 is a view taken on line 6-6 of FIG. 5.

FIG. 9 is a front perspective view of switchgear components upon which connectors are mounted.

FIG. 10 is a top view of parts shown in FIG. 9.

DETAILED DESCRIPTION

Figure 1:
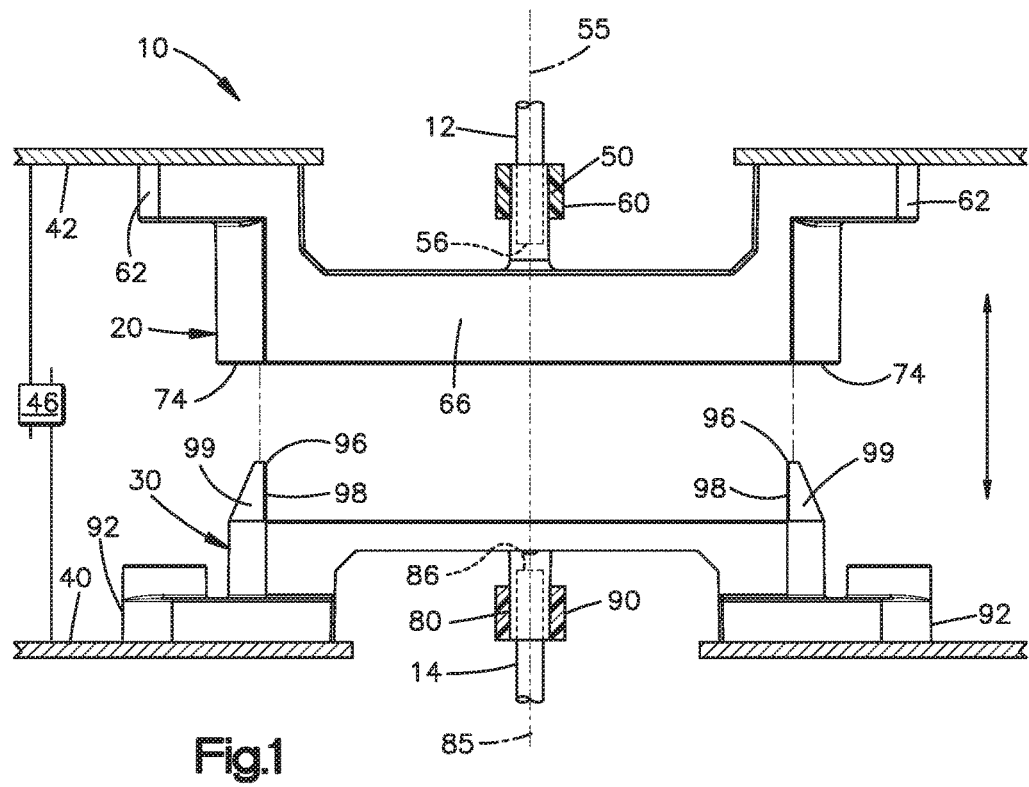
FIG. 1 is an exploded view of an apparatus including connectors for interconnecting fiber optic cables.

The structures illustrated in the drawings include examples of the elements recited in the claims. The illustrated structures thus include examples of how a person of ordinary skill in the art can make and use the claimed invention. These examples are described to meet the enablement and best mode requirements of the patent statute without imposing limitations that are not recited in the claims. Elements of one embodiment may be used in combination with, or as substitutes for, elements of another as needed for any particular implementation of the claimed invention.

Figure 2:
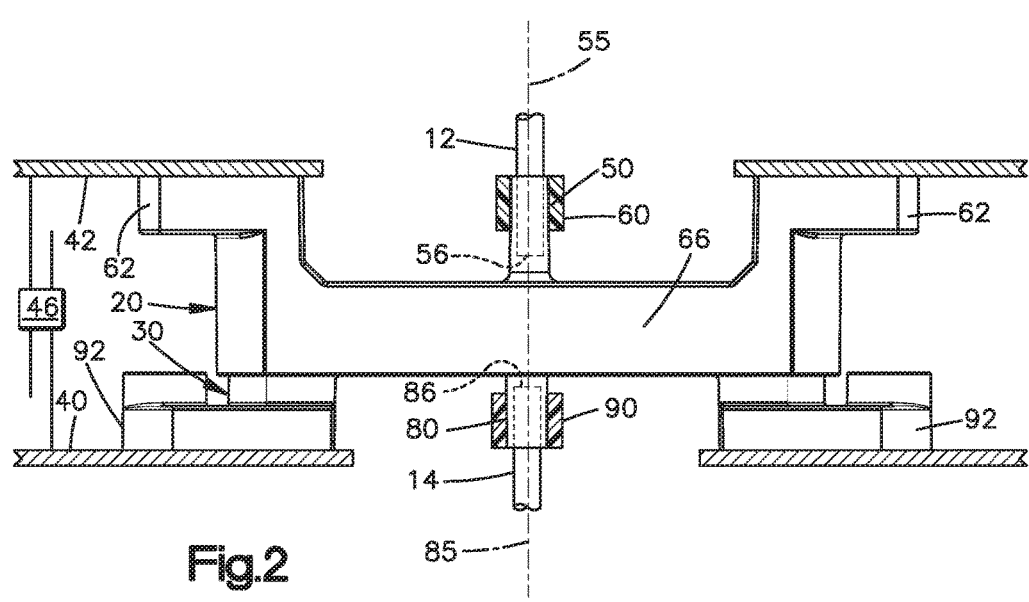
FIG. 2 is a view similar to FIG. 1, showing the connectors in a closed condition.

As shown in FIGS. 1 and 2, an apparatus 10 is configured for interconnecting first and second fiber optic cables 12 and 14. The apparatus 10 includes first and second connectors 20 and 30. In this example, the connectors 20 and 30 are mounted on corresponding switchgear component 40 and 42 that are interconnected by a linkage 46 for movement back and forth in opposite directions indicted by the arrows shown in FIG. 1. Such structures 40 and 42 could be, for example, an arc mitigation draw out device 40 supported for movement into and out of a breaker cassette 42. The connectors 20 and 30 are configured to guide the cables 12 and 14 into coaxial alignment as needed upon movement of the connectors 20 and 30 from the open positions of FIG. 1 toward and into the closed positions of FIG. 2.

As shown separately in FIG. 3, the first connector 20 has a tubular portion 50 defining a bore 51 centered on an axis 55. The bore 51 is configured to receive the cable 12 coaxially, with a terminal end 56 (FIG. 1) of the cable 12 spaced closely inward from an open inner end 57 of the bore 51. Slots 59 at opposite sides of the tubular portion 50 enable a clamping or crimping fastener 60 to secure the cable 12 within the bore 51. Such a fastener may have any suitable configuration known in the art.

In the given example, the first connector 20 is elongated in opposite directions perpendicular to the axis 51, as best shown in FIG. 4, and has opposite end portions 62 with bores 65 for receiving fasteners (not shown) for mounting on one of the structures 40 or 42. A wall portion 66 of the first connector 20 is spaced apart from the tubular portion 50. The wall portion 50 surrounds a recess 67 in which the open inner end 57 of the bore 51 is located. An outer peripheral edge 68 of the wall 66 defines an opening 69 into the recess 67. The peripheral edge 68 in the illustrated embodiment is continuous around the opening 69, and has two parallel major length portions 72 that are joined at their opposite ends by a pair of semi-circular end portions 74.

As shown in FIGS. 4 and 5, the second connector 30 has a tubular portion 80 defining a bore 81 centered on an axis 85. The bore 81 is configured to receive the cable 14 coaxially, with a terminal end 86 (FIG. 1) of the cable 14 spaced closely inward from an open inner end 87 of the bore 81. Slots 89 at opposite sides of the tubular portion 80 enable another clamping or crimping fastener 90 to secure the cable 14 within the bore 81.

In this example the second connector 30 also is elongated in opposite directions perpendicular to the axis 81, as best shown in FIG. 6, and also has opposite end portions 92 with bores 95 for receiving fasteners (not shown) for mounting on the other structure 40 or 42. Two projecting portions 96 of the second connector 30 are equally spaced apart from the tubular portion 80 along the length of the second connector 30. The projecting portions 96 project outwardly away from the open inner end 87 of the bore 81 in directions parallel to the axis 85.

Each projecting portion 96 of the second connector 30 has a planar inner surface 98. The planar inner surfaces 98 are parallel to the axis 85, and face in longitudinally opposite directions toward the open inner end 87 of the bore 81. Each projecting portion 96 further has an outer surface 99. The outer surfaces 99 face in longitudinally opposite directions away from the open inner end 87 of the bore 81, and are inclined relative to the axis 85. In the given example the outer surfaces 99 have semicircular contours that are tapered with radii that diminish in the axial direction outwardly away from the open inner end 87 of the bore 81.

Figure 7:
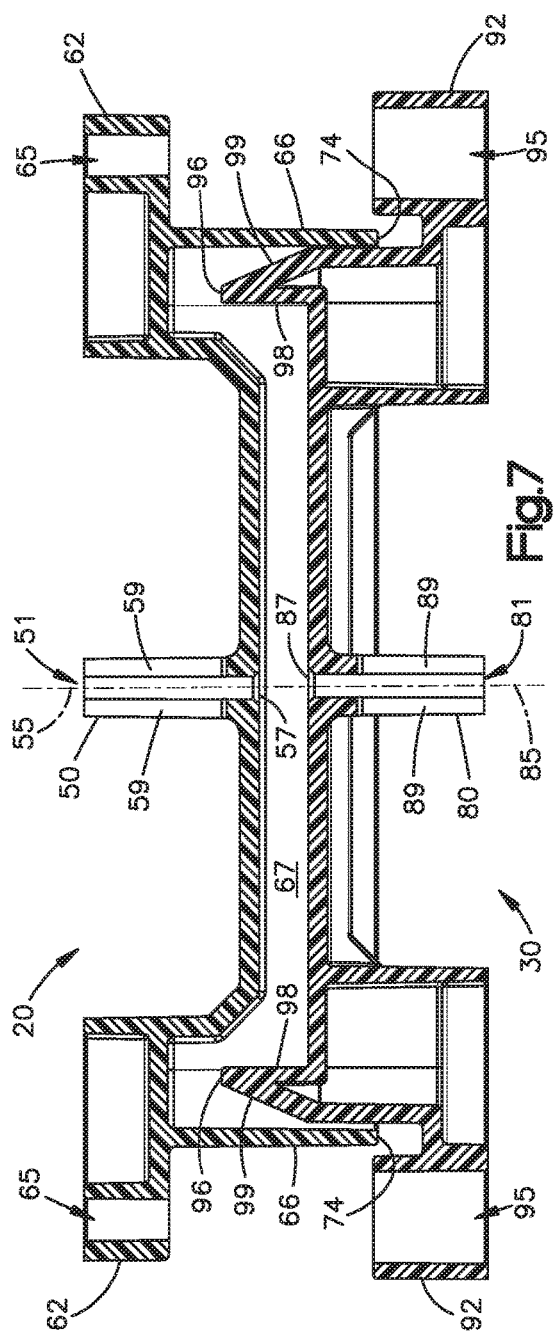
FIG. 7 is a sectional view showing the connectors in the closed condition.

The connectors 20 and 30 are thus configured as male and female connectors with alignment portions to guide the cables 12 and 14 into coaxial alignment upon movement of the connectors 20 and 30 from the open positions of FIG. 1 toward and into the closed positions of FIG. 2. Specifically, the projections 96 on the second connector 30 are moved axially toward and into the recess 67 in the first connector 20. As the projections 96 approach the wall 66 on the first connector 20, the semicircular outer surfaces 99 of the projections 96 approach the semicircular edge portions 74 of the wall 66. The tapered contours at the outer surfaces 99 enable the second connector 30 to shift lengthwise relative to the first connector 20, with corresponding radial movement between the axes 55 and 85, as needed to correct axial misalignment between the bores 51 and 81 as the semicircular outer surfaces 99 slide axially against the opposed semicircular edge portions 74. This helps to ensure coaxial alignment when the connectors 20 and 30 reach their closed positions, as shown for example in FIG. 7.

Figure 8:
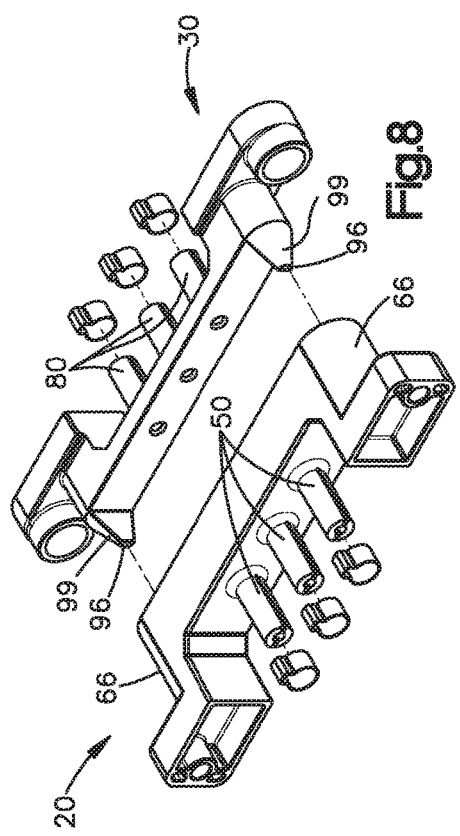
FIG. 8 is a perspective view of alternative connectors.

As shown in FIG. 8, connectors 20 and 30 in an alternate embodiment have multiple rather than singular tubular portions 50 and 80, but are otherwise the same or substantially the same as the connectors described above, as indicated by the use of the same reference numbers in FIGS. 1-7 and 8.

As noted above regarding FIG. 1, the connectors 20 and 30 are mounted on switchgear components 40 and 42. In the example of FIG. 9, one switchgear component 40 is an arc quenching draw out device, and the other 42 is a cell. The first connector 20 is mounted on the draw out device 40, and supports a first fiber optic cable 100 on an axis 101. The second connector 30 is mounted on the cell 42, and supports a second fiber optic cable 102 on an axis 103. Rails 108 support the draw out device 40 for sliding movement into and out of the cell 42. The rails 108 substantially limit relative movement of the two components 40 and 42 to the opposite directions indicated by the arrow shown in FIG. 9, with no substantial amount of movement transverse to those directions.

The first connector 20 is fixed to the draw out device 40 by fasteners 110. However, a floating mount device supports the second connector 30 on the cell 42. The floating mount device supports the second connector 30 on the cell 42 for guided movement radially relative to the cell 42 upon movement of an alignment portion 66 of the first connector 20 against an alignment portion 96 of the second connector 30. This helps to ensure coaxial alignment of the cable axes 45 and 47 when the connectors 20 and 30 reach their closed positions.

As shown in FIG. 10, the floating mount device includes a pair of shoulder bolts 120 and 122 at the opposite end portions 92 of the second connector 30. The shoulder bolts 120 and 122 together provide a range of movement for the second connector 30 to shift radially relative to the longitudinal central axes 125 and 127 of the shoulder bolts 120 and 122.

Figure 11:
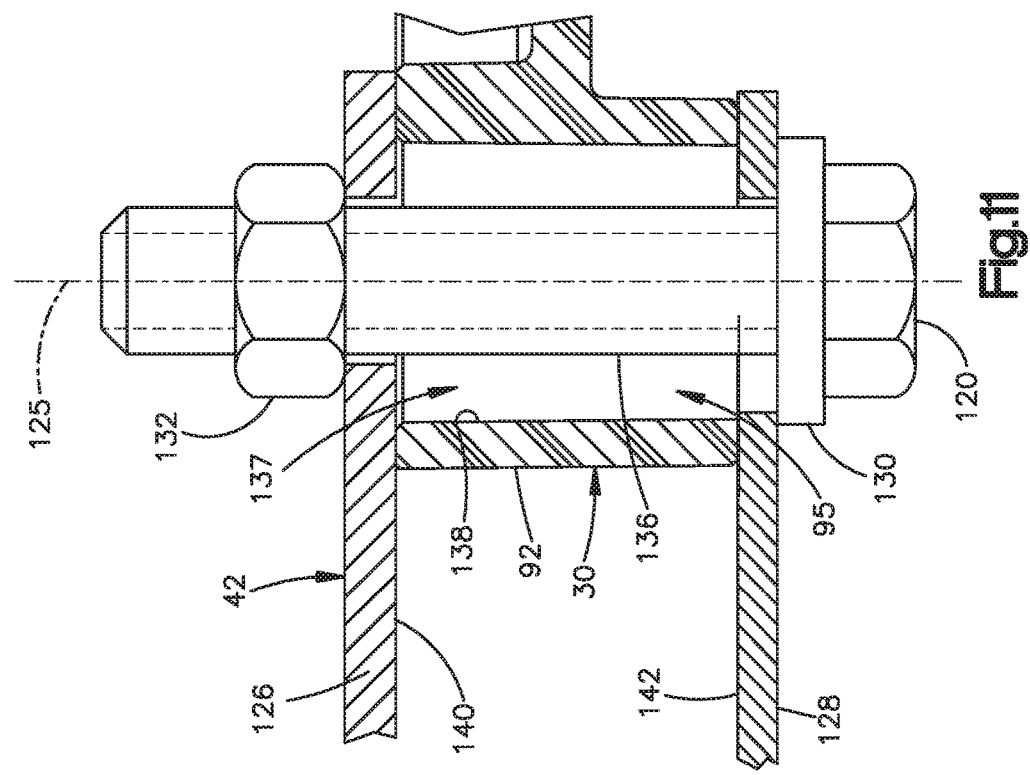
FIG. 11 is an enlarged front view of parts shown in FIG. 10.

As shown in enlarged detail in FIG. 11, the first shoulder bolt 120 fastens the first end portion 92 of the connector 30 between brackets 126 and 128 on the cell 42. IN the illustrated example, the shoulder bolt 120 projects through the bore 95 at the end portion 92 of the connector 30, and clamps the connector 30 and the brackets 126 and 128 together between a washer 130 and a nut 132.

The bore 95 is oversized relative to the shaft 136 of the shoulder bolt 120 to provide a clearance 137 radially between the shaft 136 and the surrounding surface 138 of the connector 30 in the bore 95. The nut 132 is fastened securely so that the shoulder bolt 120 is fixed to the brackets 126 and 128. However, the nut 132 is fastened loosely enough to permit the end portion 92 of the connector 30 to slide along the adjacent surfaces 140 and 142 of the brackets 126 and 128. This permits relative movement of the shaft 136 radially throughout the clearance 137 under a driving force of the first connector 20 as needed for coaxial alignment of the second connector 30 with the first connector 20.

Figure 12:
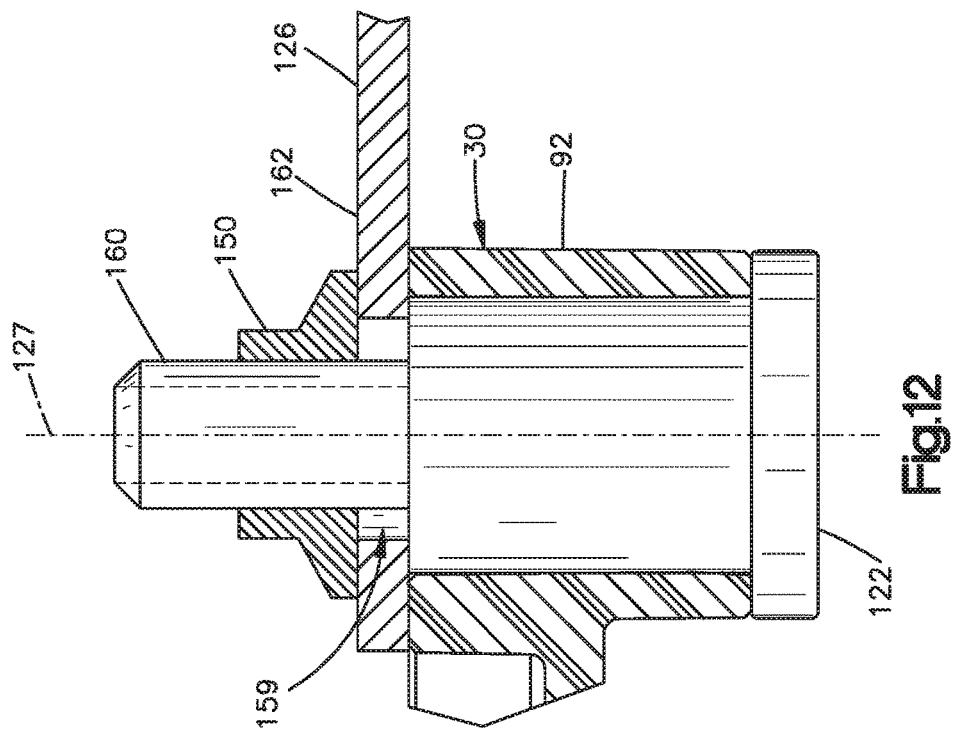
FIG. 12 is an enlarged front view of other parts shown in FIG. 10.

At the opposite end portion 92, as shown in FIG. 12, the connector 30 and the adjacent bracket 126 are clamped between the shoulder bolt 122 and a nut 150. The shoulder bolt 122 is fixed to the second connector 30. The radial clearance is provided by an oversized aperture 159 in which the bolt shaft 160 projects through the bracket 126. The nut 150 is fastened securely but loosely enough to slide along the adjacent surface 162 of the bracket 126, and thereby to permit movement of the bolt shaft 160 radially throughout the clearance in the aperture 159.

Figure 13:
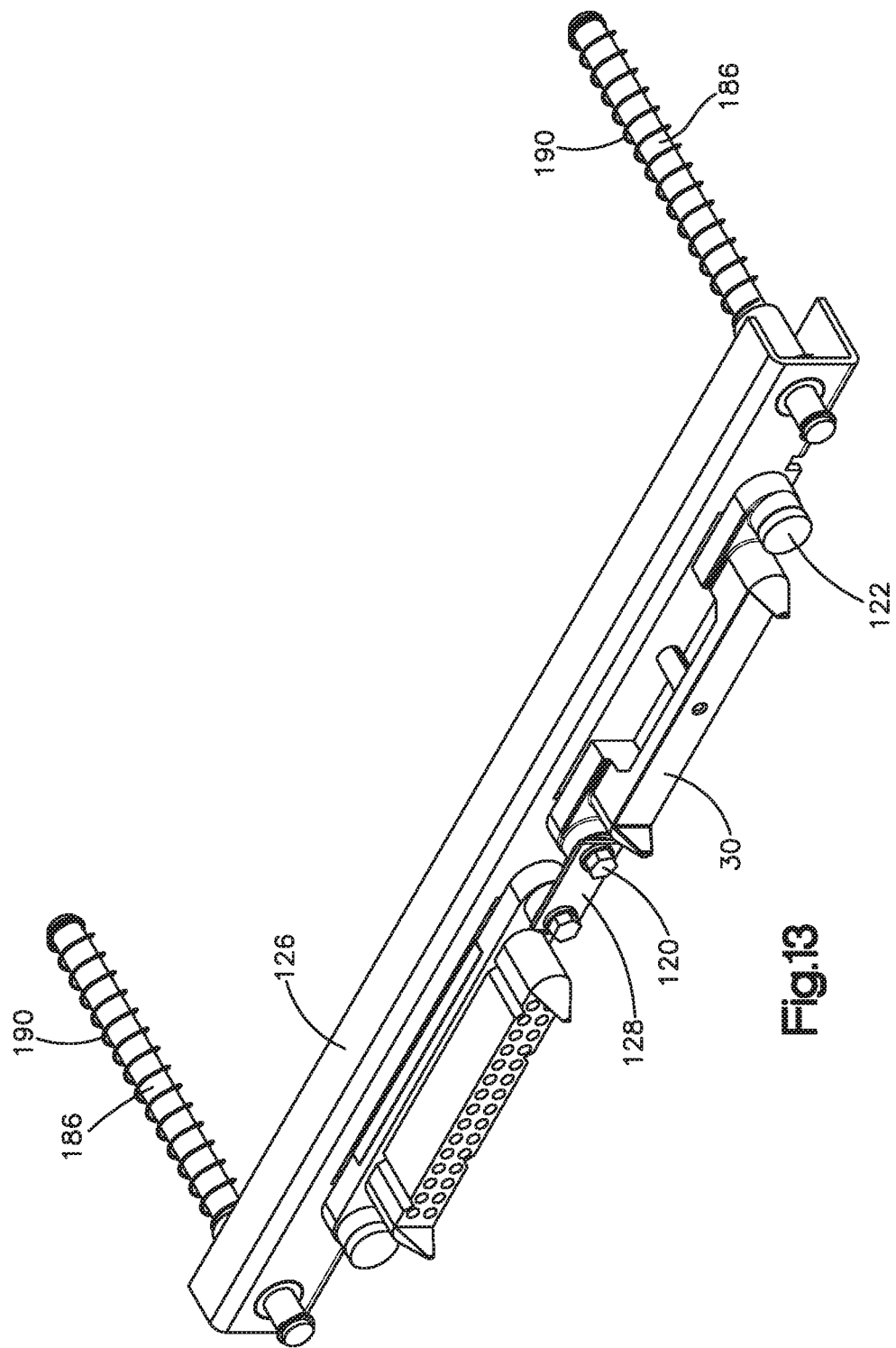
FIG. 13 is a front perspective view of parts shown partially in FIG. 9

Referring again to FIG. 9, the cell 42 includes a frame 180 that reaches across the cell 42. One of the brackets 126 (FIGS. 11 and 12) is mounted on the frame 180. That bracket 126 reaches lengthwise along a front side 182 of the frame 180. Guide bars 186 (FIG. 13) reach across and beneath the frame 180 from the bracket 126 to a rear side 188 of the frame 180. Coil springs 190 are received over the guide bars 186 between the bracket 126 and the rear side 188 of the frame 180. The bracket 126 is thus supported on the cell 42 for movement toward the rear side 188 of the frame 180 against the bias of the springs 190.

The second connector 30 is mounted on the bracket 126 as described above with reference to FIGS. 11 and 12. Accordingly, the second connector 130 is supported for movement toward the rear side 188 of the frame 180 against the bias of the springs 190. This enables the second connector 30 to move backward on the frame 180 under a driving force of the first connector 20 moving against the second connector 30 as the draw out device 40 is moved to an installed position in the cell 42.

This written description sets forth the best mode of carrying out the invention, and describes the invention so as to enable a person skilled in the art to make and use the invention, by presenting examples of the elements recited in the claims. The patentable scope of the invention is defined by the claims, and may include other examples that do not differ from the literal language of the claims, as well as equivalent examples with insubstantial differences from the literal language of the claims.

What is claimed is:

1. An apparatus comprising: first and second components;
a track supporting one of the components for movement toward the other of the components;

a first connector mounted on the first component, the first connector being configured to retain an end portion of a first fiber optic cable and having a first alignment portion;

a second connector configured to retain an end portion of a second fiber optic cable, the second connector having a second alignment portion configured to guide the second fiber optic cable radially into coaxial alignment with the first fiber optic cable upon movement of the first alignment portion against the second alignment portion; and a floating mount device supporting the second connector on the second component for guided movement radially relative to the second component upon movement of the first alignment portion against the second alignment portion.

2. An apparatus as defined in claim 1 wherein the floating mount device includes a shaft that projects through the second connector.

3. An apparatus as defined in claim 2 wherein the shaft projects into an aperture in the second connector, and the aperture is oversized relative to the shaft to provide clearance through which the second connector is movable radially relative to the shaft.

4. An apparatus as defined in claim 3 wherein the shaft is fixed to the second component.

5. An apparatus as defined in claim 2 wherein the shaft is mounted on the second component for movement radially relative to the second component, and is fixed to the second connector.

6. An apparatus as defined in claim 1 wherein the first connector is fixed to the first component.

7. An apparatus as defined in claim 1 wherein the second component includes a frame, a spring, and a bracket supported on the frame for movement against a bias of the spring, and the second connector is mounted on the bracket for movement with the bracket relative to the frame.

8. An apparatus as defined in claim 1 wherein the first and second components are switchgear components.

9. An apparatus as defined in claim 8 wherein the second component defines a cell, and the track supports the first component for movement into and out of the cell.

10. An apparatus comprising: first and second components;

a track supporting one of the components for movement toward the other of the components;

a first connector mounted on the first component, the first connector being configured to retain an end portion of a first fiber optic cable and having a first alignment portion; and a second connector configured to retain an end portion of a second fiber optic cable, the second connector having a second alignment portion configured to guide the second fiber optic cable radially into coaxial alignment with the first fiber optic cable upon movement of the first alignment portion against the second alignment portion;

wherein the second component includes a frame, a spring, and a bracket supported on the frame for movement against a bias of the spring, and the second connector is mounted on the bracket for movement with the bracket relative to the frame.

11. An apparatus as defined in claim 10 further comprising a floating mount device supporting the second connector on the bracket for guided movement radially relative to the second component upon movement of the first alignment portion against the second alignment portion.

12. An apparatus as defined in claim 11 wherein the floating mount device includes a shaft that projects through the second connector.

13. An apparatus as defined in claim 12 wherein the shaft projects into an aperture in the second connector, and the aperture is oversized relative to the shaft to provide clearance through which the second connector is movable radially relative to the shaft.

14. An apparatus as defined in claim 13 wherein the shaft is fixed to the second component.

15. An apparatus as defined in claim 12 wherein the shaft is mounted on the second component for movement radially relative to the component, and is fixed to the second connector.

16. An apparatus as defined in claim 10 wherein the first connector is fixed to the first component.

17. An apparatus as defined in claim 10 wherein the second component includes a frame, a spring, and a bracket supported on the frame for movement against a bias of the spring, and the second connector is mounted on the bracket for movement with the bracket relative to the frame.

18. An apparatus as defined in claim 10 wherein the first and second components are switchgear components.

19. An apparatus comprising:

first and second switchgear components including a cell and draw out device; a track supporting the draw out device for movement into and out of the cell;

a first connector mounted on the first switchgear component, the first connector being configured to retain an end portion of a first fiber optic cable and having a first alignment portion;

a second connector configured to retain an end portion of a second fiber optic cable, the second connector having a second alignment portion configured to guide the second fiber optic cable radially into coaxial alignment with the first fiber optic cable upon movement of the first alignment portion against the second alignment portion; and a floating mount device supporting the second connector on the second switchgear component for guided movement radially relative to the second switchgear component upon movement of the first alignment portion against the second alignment portion;

wherein the second switchgear component includes a frame, a spring, and a bracket supported on the frame for movement against a bias of the spring, and the second connector is mounted on the bracket for movement with the bracket relative to the frame.

20. An apparatus as defined in claim 19 wherein the first connector is fixed to the first switchgear component.

* * * * *